United States Patent
Boday et al.

(10) Patent No.: US 9,884,948 B2
(45) Date of Patent: Feb. 6, 2018

(54) POROUS MATERIALS AND METHOD OF MAKING POROUS MATERIALS

(71) Applicant: International Business Machines Corporation, Armonk, NY (US)

(72) Inventors: Dylan J. Boday, Tucson, AZ (US); Mareva B. Fevre, San Jose, CA (US); Jeannette M. Garcia, San Leandro, CA (US); James L. Hedrick, Pleasanton, CA (US); Rudy J. Wojtecki, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 272 days.

(21) Appl. No.: 14/920,628

(22) Filed: Oct. 22, 2015

(65) Prior Publication Data
US 2017/0114204 A1   Apr. 27, 2017

(51) Int. Cl.
*C08G 75/26* (2006.01)
*C08J 9/26* (2006.01)
(Continued)

(52) U.S. Cl.
CPC .......... *C08J 9/26* (2013.01); *C08G 73/065* (2013.01); *C08G 73/0644* (2013.01);
(Continued)

(58) Field of Classification Search
CPC ...... C08G 75/02; C08G 18/52; C08G 12/046; C08G 18/728; C08G 18/714; C08G 18/715
See application file for complete search history.

(56) References Cited

U.S. PATENT DOCUMENTS 2,902,402 A * 9/1959 Lambrech ............ C07D 213/76
514/225.2
3,340,232 A   9/1967 Smith et al.
(Continued)

FOREIGN PATENT DOCUMENTS

SU           795491 A3    1/1981

OTHER PUBLICATIONS

J. M. Garcia, G. O. Jones, K. Virwani, B. D. McCloskey, D. J. Boday, G. M. ter Huurne, H. W. Horn, D. J. Coady, A. M. Bintaleb, A. M. S. Alabdulrahman, F. Alsewailem, H. A. A. Almegren, J. L. Hedrick. "Recyclable, Strong Thermosets and Organogels via Paraformaldehyde Condensation with Diamines". Science vol. 344 May 2014 pp. 732-735.*
(Continued)

*Primary Examiner* — Kara Boyle
*Assistant Examiner* — Christina Wales
(74) *Attorney, Agent, or Firm* — Patterson + Sheridan, LLP

(57) ABSTRACT

A porous material includes a polyhexahydrotriazine material. Pores in the porous material can be of various sizes including nanoscale sizes. The porous material may be used in a variety of applications, such as those requiring materials with a high strength-to-weight ratio. The porous material can include a filler material dispersed therein. The filler material can be, for example, a particle, a fiber, a fabric, or the like. In some examples, the filler material can be a carbon fiber or a carbon nanotube. A method of making a porous material includes forming a resin including a polyhemiaminal or polyhexahydrotriazine component and a polythioaminal component. The resin can be heated to promote segregation of the components into different phases with predominately one or the other component in each phase. Processing of the
(Continued)

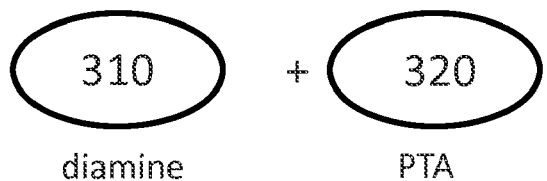

diamine + PTA paraformaldehyde
→
heat

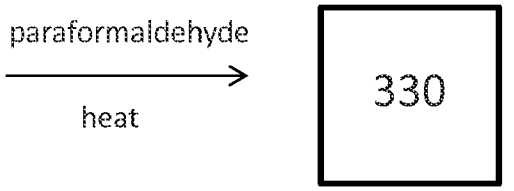

PTA & PHT/PHA resin after phase segregation to decompose the polythioaminal component can form pores in the resin.

16 Claims, 3 Drawing Sheets

(51) Int. Cl.

| | |
|---|---|
| *C08G 73/06* | (2006.01) |
| *C08G 75/02* | (2016.01) |
| *C08K 7/06* | (2006.01) |
| *C08K 7/24* | (2006.01) |

(52) U.S. Cl.
CPC ............... *C08G 75/02* (2013.01); *C08K 7/06* (2013.01); *C08K 7/24* (2013.01); *C08J 2201/0464* (2013.01); *C08J 2201/052* (2013.01); *C08J 2349/00* (2013.01); *C08J 2379/04* (2013.01); *C08J 2381/02* (2013.01)

(56) References Cited

U.S. PATENT DOCUMENTS

| | | | |
|---|---|---|---|
| 3,598,748 A | 8/1971 | Hirosawa et al. | |
| 4,025,469 A | 5/1977 | Kauffman | |
| 4,225,481 A | 9/1980 | Wagner | |
| 4,246,160 A | 1/1981 | Wagner et al. | |
| 4,310,633 A | 1/1982 | Haas et al. | |
| 5,093,378 A | 3/1992 | Ishiwaka et al. | |
| 5,891,983 A | 4/1999 | Albrecht et al. | |
| 2009/0039018 A1 | 2/2009 | Jordi et al. | |
| 2015/0104579 A1 | 4/2015 | Hedrick et al. | |
| 2016/0257785 A1* | 9/2016 | Grate | C08G 73/0644 |
| 2017/0145255 A1* | 5/2017 | Boday | A01N 25/34 |

OTHER PUBLICATIONS

R. J. Wojtecki, G. O. Jones, A. Y. Yuen, W. Chin, D. J. Boday, A. Nelson, J. M. Garcia, Y.Y. Yang, and J. L. Hedrick. "Developments in Dynamic Covalent Chemistries from the Reaction of Thiols with Hexahydrotriazines" J. Am. Chem. Soc., 2015, 137 (45), pp. 14248-14251.*

Jeanette M. Garcia et al., Recyclable, Strong Thermosets and Organogels via Paraformaldehyde Condensation with Diamines, Science AAAS, vol. 344, May 16, 2014, pp. 732-735.

D.R. Anderson et al., Thermally resistance polymers containing the s-triazine ring, Journal of Polymer Science Part A-1: Polymer Chemistry, vol. 4, Issue 7, pp. 1689-1702.

John Markoff, Error at IBM Lap Finds New Family of Materials, New York Times, May 15, 2014, 4 pages.

Wang Yulan et al., Synthesis and Properties of Poly-1, 3, 5-Triazines, Polymer Communications, No. 2, 1984, pp. 117-123.

Ferrar, "Reactions of Formaldehyde With Aromatic Amines," J. Appl. Chem, 14, 1964, 389-399.

Hiller, et al., "Laser-engravable hexahydrotriazine polymer networks," Mat Res Innovat (2002) 6:179-184.

U.S. Appl. No. 14/516,117, filed Oct. 16, 2014, 23 pages.
U.S. Appl. No. 14/564,650, filed Dec. 9, 2014, 21 pages.

* cited by examiner

POROUS MATERIALS AND METHOD OF MAKING POROUS MATERIALS

INCORPORATION BY REFERENCE

The inventors hereby incorporate by reference, filed in the U.S. Patent Office on Oct. 10, 2013 as application Ser. No. 14/050,995.

BACKGROUND

The present disclosure relates to porous materials, and more specifically, to porous materials including polymeric materials and methods of making porous materials comprising polymeric materials.

SUMMARY

According to one embodiment of the present disclosure, a porous material includes polyhexahydrotriazine (PHT) material having a plurality of pores therein. The pores formed therein can be nanoscale pores. PHT material includes a plurality of trivalent hexahydrotriazine (HT) groups having the structure (1):

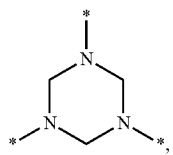

(1)

and
a plurality of divalent bridging groups of structure (2):

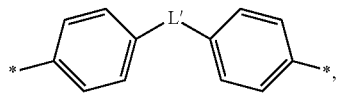

(2)

wherein L' is a divalent linking group selected from the group consisting of *—O—*, *—S—*, *—N(R')—*, *—N(H)—*, *—R"—*, and combinations thereof, wherein R' comprises at least 1 carbon and R" comprises at least one carbon. In some embodiments, each starred bond of a given hexahydrotriazine group is covalently linked to a respective one of the divalent bridging groups, and each starred bond of a given bridging group is linked to a respective one of the hexahydrotriazine groups. In some embodiments, each nitrogen of a given hexahydrotriazine group is covalently linked to a respective aromatic carbon para to L' of a different one of the divalent bridging groups, and each starred bond of a given bridging group is linked to a different hexahydrotriazine group. In some examples, the porous material includes a filler, such as a particle, a fiber, or a fabric. In some examples, the filler is a carbon fiber. The filler may have dimensions such as it may be further described as a nanoparticle, nanofiber, or nanotube. In some example applications, the porous material can be formed into a structural component that requires a high strength-to-weight ratio.

According to another embodiment of the present disclosure, a method that can be used to form a porous material includes: forming a reaction mixture comprising: i) paraformaldehyde, ii) a monomer including at least two primary aromatic amine groups, and iii) a polythioaminal including at least two primary aromatic amine groups; then heating the reaction mixture to form a resin including a polyhexahydrotriazine (PHT) component and a polythioaminal (PTA) component. The PHT component includes PHT material similar to that as described above. The PTA component includes polythioaminal material having the general structure (3):

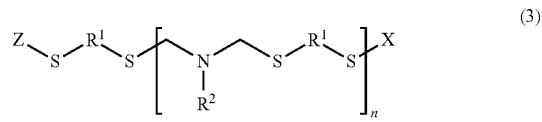

(3)

wherein each instance of $R^1$ is independently an organic or hetero-organic group. In some cases, each instance of $R^1$ may be the same species. Each instance of $R^2$ is independently an organic or hetero-organic group that may have a molecular weight of not more than about 120 Daltons, and each instance of $R^2$ may be the same species. X and Z are each, independently, a sulfur-bonded species, and n is an integer greater than or equal to 1. In each instance, $R^1$ may be a hydrocarbon species, an aromatic species, an aliphatic species, or a polymer species, such as polyethylene glycol species, polyol species, or polyether species, any of the preceding of which can have substituents other than hydrogen. In one embodiment, at least one instance of $R^1$ is polyethylene glycol. In another embodiment, each instance of $R^1$ is the same species. In yet another embodiment, each instance of $R^1$ is aromatic. In some examples, the porous material thus formed includes a filler, such as a particle, a fiber, or a fabric. In some examples, the filler is a carbon fiber. The filler may have dimensions such as it can be further described as a nanoparticle, nanofiber, or nanotube. In some example applications, the porous material can be formed into a structural component that requires a high strength-to-weight ratio. Paraformaldehyde is a polyacetal $OH(CH_2O)_mH$ (wherein m is typically in a range of 8-100).

In another embodiment of the present disclosure, a method includes contacting a polythioaminal (PTA) having terminal amine groups and a diamine monomer in the presence of paraformaldehyde to form a resin including a PTA rich phase and a PHT rich phase. The polythioaminal in the resultant resin can be decomposed by heating, exposure to water, exposure to weak acids, or otherwise to form a porous resin material including PHT. In some examples, the PTA can be decomposed by heating under low pressure conditions (such as under vacuum conditions) to promote removal of PTA decomposition products. In some examples, the weak acid can be acetic acid.

In another embodiment of the present disclosure, a method includes forming a mixture including: i) trifunctional ethynyl monomer, ii) a polythioaminal (PTA), and iii) a solvent. The mixture is heated to a first temperature at which the trifunctional ethynyl monomer polymerizes to a first resin and the PTA is substantially stable. The mixture is then heated to a second temperature at which the first resin further polymerizes (e.g., crosslinks to a solid material) to a second resin that is a substantially crosslinked resin and the PTA decomposes. The second temperature is higher than the first temperature. In a particular example, the trifunctional ethynyl monomer is 1,3,5 tris-(4-ethynyl phenyl)benzene. The mixture may include a filler. The filler can be a particle, a fiber, or a fabric. In some examples, the filler is a carbon fiber. The filler may have dimensions such as it can be further described as a nanoparticle, nanofiber, or nanotube. The mixture can be processed (e.g., molded, applied as a coating, used as binding resin, etc.) to form an end use or structural component before heating to the second temperature or the heating to the second temperature may occur during the processing of the mixture into the end use or structural component.

In another embodiment of the present disclosure, a porous material is formed by forming a reaction mixture comprising: i) paraformaldehyde, ii) a monomer including at least two primary aromatic amine groups, and iii) a polythioaminal including at least two primary aromatic amine groups. The reaction mixture is heated to form a resin including a polyhexahydrotriazine (PHT) component and a polythioaminal (PTA) component. The resin is heated such that a polyhexahydrotriazine (PHT) rich phase and a polythioaminal (PTA) rich phase form in the resin. The resin is then processed to decompose the polythioaminal component, for example, the resin can be heated to a temperature at which the polythioaminal component decomposes and the polyhexahydrotriazine component is substantially stable. The polythioaminal component may also be decomposed by exposure to water and/or weak acids. Breakdown of the polythioaminal (PTA) component forms the pores in the remaining resin material including the polyhexahydrotriazine (PHT) component. The pores can be nanoscale pores. In some examples, a filler can be disposed in the resin. The filler can be a particle, a fiber, or a fabric. In some examples, the filler is a carbon fiber. The filler may have dimensions such as it can be further described as a nanoparticle, nanofiber, or nanotube. In some example applications, the porous material can be formed into a structural component that requires a high strength-to-weight ratio. A solvent can optionally be incorporated in the reaction mixture.

DETAILED DESCRIPTION

Preparation of various polyhemiaminal and polyhexahydrotriazine materials is described in Ser. No. 14/050,995, filed in the U.S.P.T.O. on Oct. 10, 2013, the entire contents of which has been incorporated herein by reference. Polyhexahydrotriazine materials generally have a high modulus and good thermal stability. These properties make polyhexahydrotriazine attractive for uses in many applications such as, for example, fabrication of automobile and aerospace components, and more generally any application requiring high strength-to-weight-ratios. Amongst other advantages, polyhexahydrotriazine may provide improved strength and thermal stability as compared to incumbent polymer materials used in these applications. In many such applications, further reductions in component weight and increases in strength are desirable. As such, a porous polyhexahydrotriazine material could be used to reduce component weight, while still providing sufficient structural and thermal stability. Similarly, polyhexahydrotriazine might be used in conjunction with filler materials such as fibers and/or particles to provide high strength components. A porous polyhexahydrotriazine material could also be used in conjunction with filler materials to provide lighter composite materials. Additionally, a porous polyhexahydrotriazine material could be used as a dielectric material in, for example, semiconductor device applications. Also, porous polyhexahydrotriazine material could be adopted as a catalyst support substrate. Thus, these porous materials and methods for preparing these porous materials are desirable.

Many different technologies have been explored in recent years regarding formation of composite materials by incorporation of various particles, fibers, fabrics, nanoparticles, nanofibers, and nanotubes into various binder resins. These binder resins, often referred to as "matrix resins," generally are required to have high thermal stability, high dimensional stability, a high modulus, good solvent resistance, and strong adhesion to the incorporated filler. And while composite components are by their nature generally lighter than the metal components they often replace, it is still desirable to further reduce the weight of these composite components when such is possible without substantial reduction in strength of the end-use component. As such, a porous polyhexahydrotriazine resin could be adopted as a matrix resin in a composite material, such as, for example, a carbon fiber composite to reduce overall composite component weight.

Figure 1:
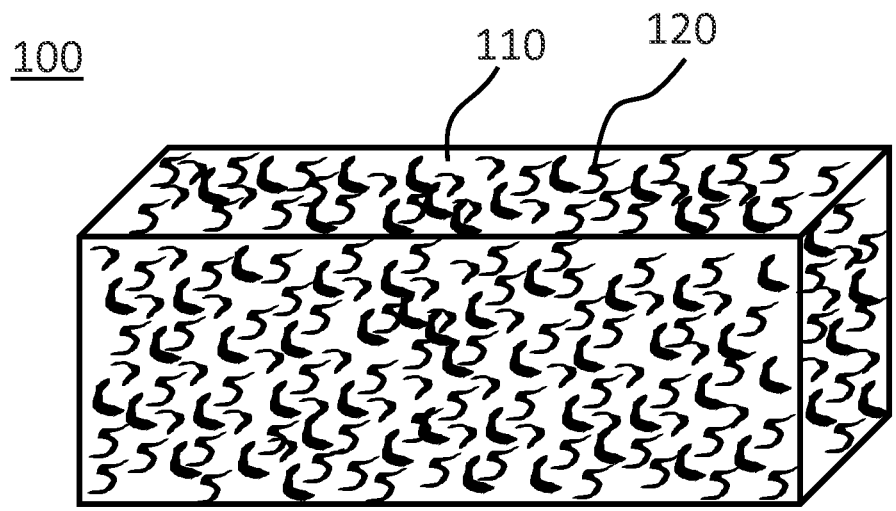
FIG. 1 depicts a phase-segregated material including polyhexahydrotriazine and polythioaminal.

With reference to FIG. 1, a resin material 100 includes a first component such as a polyhexahydrotriazine (PHT) component and a second component such as polythioaminal (PTA) component. A method described below in conjunction with FIG. 3 can be used to make resin material 100. In a particular example, resin material 100 can be prepared by reaction of amine terminated polythioaminals and a diamine monomer in the presence of paraformaldehyde. By this reaction, copolymers of PHT and PTA can be prepared. In other embodiments, the resin 100 may be a physical blend of a PTA material and a resin material other than PHT.

In FIG. 1, a PHT component is in portion 110 of the resin material 100. A PTA component is in portion 120 of the resin material 100. As depicted, portion 120 is generally dispersed within portion 110, but the reverse may also occur. Portion 110 may be referred to as a "PHT rich phase" of resin material 100. Portion 120 may be referred to as a "PTA rich phase" of resin material 100. In this context, a "rich phase" is a region or portion of the resin material 100 in which one of the components predominates over the other, the term however does not necessarily imply complete exclusion of the other component from the region or portion, though complete or substantially complete exclusion is also contemplated.

A certain PHT can be represented by general structure (4):

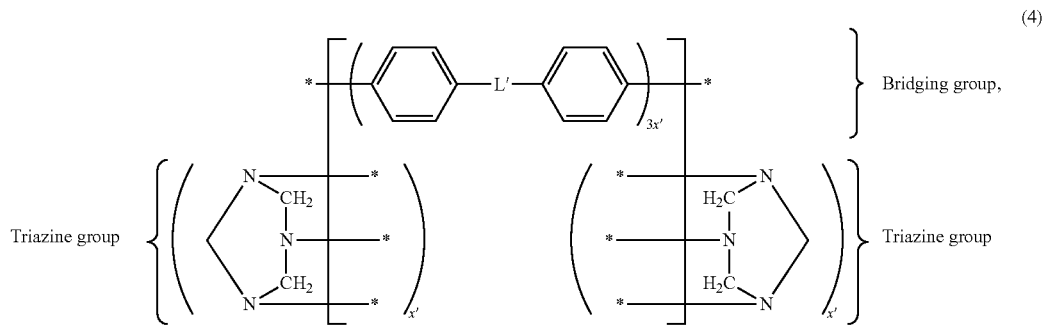

wherein x' is moles, L' is a divalent linking group selected from the group consisting of —O—, —S—, —N(R')—, —N(H)—, —R"—, and combinations thereof, wherein R' comprises at least 1 carbon and R" comprises at least one carbon. Each starred bond of a given hexahydrotriazine group in structure (4) is covalently linked to a respective one of the bridging groups. Additionally, each starred bond of a given bridging group is covalently linked to a respective one of the hexahydrotriazine groups. In a particular embodiment, at least some bridging groups can include an L' wherein —R"— has the following general structure (5):

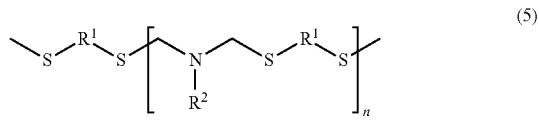

wherein each instance of $R^1$ is independently an organic or hetero-organic group. In some cases, each instance of $R^1$ may be the same species. Each instance of $R^2$ is independently an organic or hetero-organic group that may have a molecular weight of less than 120 Daltons, each instance of $R^2$ may be the same species, and n is an integer greater than or equal to 1. When R" corresponds to formula (5), R" in this context can be referred to as a PTA component.

In an embodiment, resin material 100 can include a PHT-PTA copolymer including the following structure (6), where the depicted dashed lines represent connections to other PHT groups, to other PTA groups, or end groups:

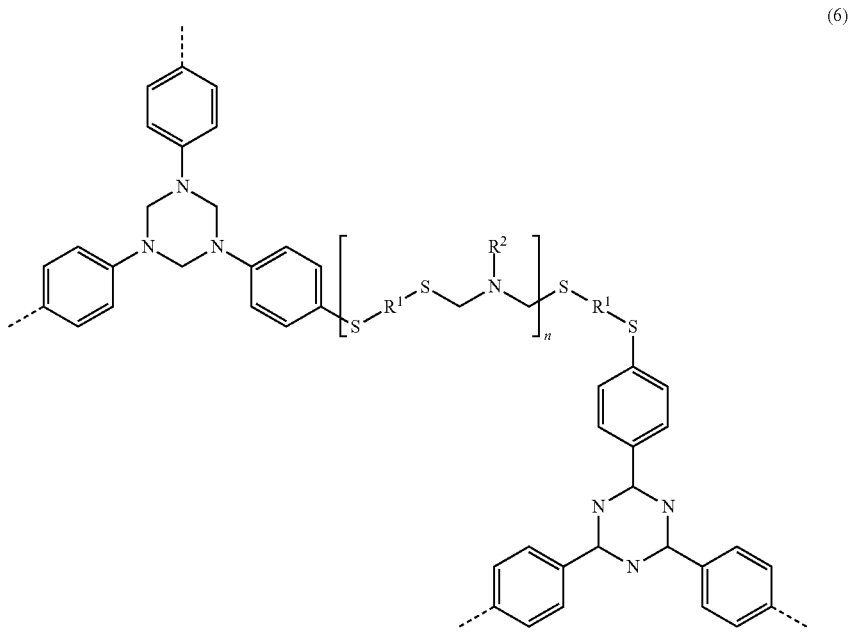

In general, the PHT-PTA copolymer represented by structure (6) will be a cross-linked polymer. The ratio of PHT groups to PTA groups can be adjusted by varying feed ratio and/or reaction conditions. The ratio of end groups to PHT and PTA groups can be adjusted by incorporation of diluent primary amine reactants (i.e., a reactant having only one primary amine group) and/or the reaction conditions. The $R^1$ and $R^2$ groups are as described above. Also, n is as described above.

As an example, resin material 100 can be formed in the following manner. A PTA material can be synthesized from a hexahydrotriazine and a dithiol according to the general scheme (7):

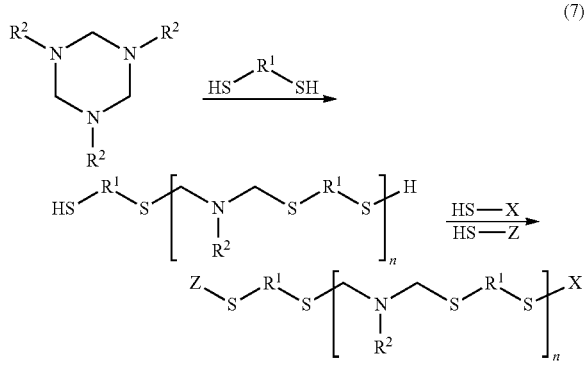

(7)

In this scheme, $R^1$ and $R^2$ are as described above. X and Z are each, independently, a sulfur-bonded species, and n is an integer greater than or equal to 1. In each instance, $R^1$ may be a hydrocarbon species, an aromatic species, an aliphatic species, or a polymer species such as polyethylene glycol species, polyol species, or polyether species, any of which species may have non-hydrogen substituents, as governed by the dithiols used in the reaction scheme. In one embodiment, at least one instance of $R^1$ is polyethylene glycol. In another embodiment, each instance of $R^1$ is an alkyl group and X and Z are primary aromatic amines. For example, each $R^1$ may be an n-alkyl group such as one of an ethyl ($C_2H_4$) group, a propyl ($C_3H_6$) group, or a butyl ($C_4H_8$) group.

Alkane dithiols such as ethane dithiol, propyl dithiol, butane dithiol, pentane dithiol, and hexane dithiol may be used as precursors. Aromatic dithiols such as benzene dithiol, toluene dithiol, and xylene dithiol may also be used as precursors. The dithiol may be a polymer species, such as a dithiol-capped polyolefin. Dithio-polyol species may also be used, such as dithio-alkane diols, triols, and the like. Each instance of $R^2$ may independently be hydrogen, fluorine, methyl, or an alkyl group, such as ethyl, propyl, butyl, hexyl, or cyclohexyl.

In scheme (7) the initial polymerization step to form a polythioaminal can be conducted using a single dithiol component or a mixture of dithiol components. When a mixture of dithiol components (i.e., different $R^1$ groups) are used, a copolymer polythioaminal can be formed. The reaction can be conducted so as to form random copolymers by using mixed dithiol components. Various block copolymers (or terpolymers, etc.) can be synthesized by performing reactions in sequence using different dithiol components at different times.

The initial polymerization reaction may be performed in a solvent medium such as N-methyl pyrrolidone (NMP), or other suitable solvent, to control viscosity. An example of such reaction is the reaction between 1,3,5-trimethylhexahydrotriazine and 1,4-butanedithiol, as follows:

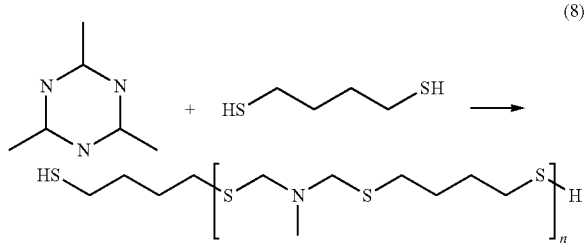

(8)

Reaction (8) may be performed using NMP as solvent or using the reactants themselves as solvent. For example, the reaction (8) may be performed in excess triazine up to about 2 equivalents, such as from 1.3 to 1.5 equivalents, for example about 1.3 equivalents. The precursors may be obtained from commercial suppliers or may be synthesized. In an example process, reaction (8) is carried as follows: the dithiol precursor is added to 1.3 equivalents of the triazine precursor in a stirred vessel. The vessel is purged with nitrogen or other inert gas and sealed, and the reaction mixture is heated to about 85° C. The reaction mixture is maintained at about 85° C. for about 18 hours to form oligomeric or low molecular weight polymeric material. Vacuum is then applied to the vessel to remove volatile byproducts, driving growth in molecular weight of the resulting polymer molecules according to LeChatelier's Principle. The reaction can be allowed to proceed for 24 hours or longer, however, stirring may ultimately cease due to the increasing viscosity of the reaction mixture. The resulting polymer is typically optically transparent and may range from a solid to a viscous liquid.

In scheme (7), each instance of $R^2$ is preferably selected to form an amine byproduct ($R^2$—$NH_2$) that is volatile at a temperature below 200° C. The preference for relatively low boiling $R^2$—$NH_2$ byproducts is because some $R^2$ groups on the hexahydrotriazine precursor are ultimately incorporated into a byproduct rather than the resultant polymer. If the byproduct can be removed from the reaction mixture by volatilization or otherwise, then polymer growth will, in general, be enhanced. For example, scheme (7) may comprise mixing the dithiol and the N-substituted hexahydrotriazine in a vessel to form a reaction mixture, and heating the reaction mixture to form the polythioaminal polymer. The substituent (e.g., $R^2$) bonded to a nitrogen atom of the N-substituted hexahydrotriazine may be incorporated into a bis-amine byproduct, which can decompose into an amine byproduct ($R^2$—$NH_2$), rather than being incorporated in the polythioaminal. Thus, $R^2$ substituent may be selected such that the amine byproduct is volatile at temperatures below 200° C. so that it can be removed from the reaction mixture during the polymerization reaction, so as to increase molecular weight of the resultant polymer by driving the polymerization reaction forward. The byproduct can be removed by pumping off the generated vapor and/or by inclusion of molecules or materials which remove or otherwise sequester the byproduct from the remaining reactants.

The mixture of the triazine reactant and dithiol reactant may be heated to a temperature generally above room temperature and up to about 200° C. In some cases, temperatures above 200° C. may be used, but some polymers will degrade at higher temperatures (e.g., above 200° C.). In most cases, a reaction temperature of 50-100° C., for example about 80° C., will be sufficient to promote formation of the polythioaminal polymer. The mixture may be stirred, or otherwise mixed, during formation of the polythioaminal polymer. A higher reaction temperature may be used in some cases to promote removal of byproducts.

The hexahydrotriazine precursor may be any of the hexahydrotriazine precursors described herein. And, as noted, one or more of the substituents bound to the nitrogen atoms of the hexahydrotriazine precursor may be ultimately incorporated into an amine byproduct during the polymerization reaction, so the precursor should generally be selected such that this resultant amine byproduct is volatile at or below the reaction temperature. This byproduct may sufficiently volatilize from heating alone, or vacuum may be applied to encourage removal.

Formation of the polythioaminal polymer may be controlled by adjusting temperature of the reaction mixture and by adjusting solvent content of the reaction mixture. Lowering temperature or adding solvent will generally slow the rate of polymerization and slow increases in product polymer molecular weight. Raising temperature or using less solvent will generally increase the rate of polymerization and growth of product polymer molecular weight, though the reaction temperature is ultimately limited by the thermal stability of the product polymer and very high viscosities may otherwise prevent necessary molecular interactions between reactants. Solvents such as N-methyl-2-pyrrolidone or other suitable aprotic solvents, which may include dimethylsulfoxide (DMSO), N,N-dimethylformamide (DMF), N,N-dimethylacetamide (DMA), propylene carbonate (PC), and propylene glycol methyl ether acetate (PGMEA), or mixtures thereof, can be used as reaction mixture solvents.

It should also be noted that more than one triazine precursor may be used to make the polythioaminal polymer according to scheme (7). For example, a random copolymer may be made by using two different triazine precursors with one dithiol precursor. A block copolymer may be made by making a first segment using a first triazine precursor, making a second segment using a second triazine precursor, and then joining the first and second segments using the first triazine precursor, the second triazine precursor, or a mixture of the first and second triazine precursors. A variety of mixed polymers may thus be made by using mixtures of dithiol precursors and/or mixtures of triazine precursors according to scheme (7).

In the formulas herein, X and/or Z are not particularly limited provided they are thiol reactive species. For example, X and/or Z may be a species selected from the group consisting of hydrogen, an alkane thiol, an aromatic thiol such as a thiophenol or a thioaniline, a peptide, a protein, a thio-acid, a nucleotide, and combinations thereof, with the proviso that X and Z are not both hydrogen. X and Z may each be initially provided to the reaction mixture as a solid, a liquid, or a gas. In scheme (7) above, the reaction with HS—X may be performed in a bulk liquid phase or at a phase interface between the bulk liquid phase and a gas phase, an immiscible liquid phase, or a solid phase. Similarly, the reaction of HS—Z may be performed in a bulk liquid phase or at a phase interface between the bulk liquid and a gas phase, an immiscible liquid phase, or a solid phase. The reactions of HS—X and HS—Z with the initial polythioaminal may occur simulataneously.

In a particular embodiment, the X and Z are each primary aromatic amines and the polythiolaminal has the following structure (9):

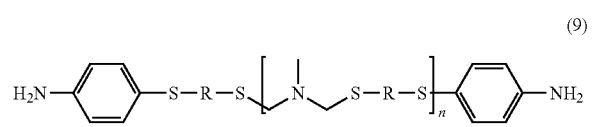

(9)

wherein R corresponds to $R^1$ as described above, and n is again an integer greater than or equal to 1.

Figure 2:
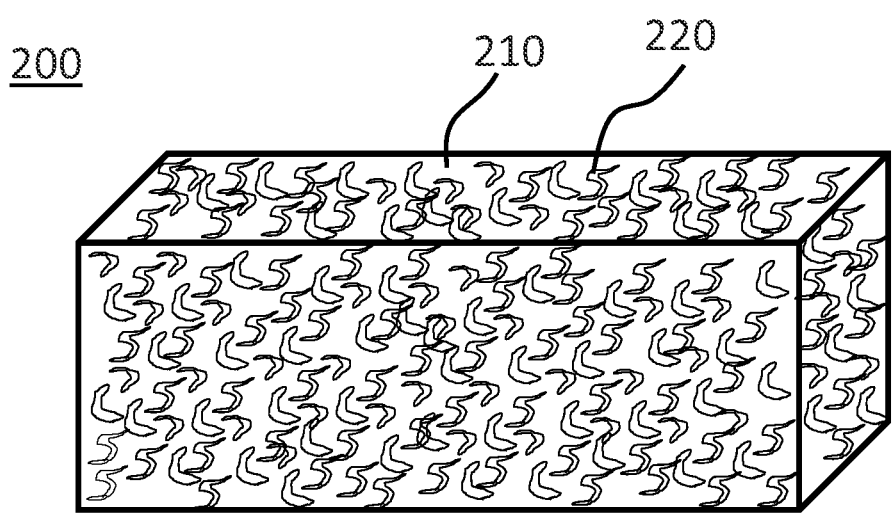
FIG. 2 depicts a porous material including a polyhexahydrotriazine.

With reference now to FIG. 2, the resin material 100 has been processed to provide porous resin material 200. The porous resin material 200 includes portion 210 and pores 220. In this example, portion 210 corresponds to the PHT rich phase of resin material 100 and the pores 220 correspond in positioning to the PTA rich phase of resin material 100. The PTA material in portion 120 has been broken down by thermal processing as an example; however, other processing may be adopted to break down the PTA material. PTA material may be, in addition to heating or instead of heating, broken down by exposure to water and/or an acid, such as acetic acid. The degradation of PTA (in portion 120) forms the pores 220 in the porous resin material 200. Note that while pores 220 appear, as depicted in FIG. 2, to maintain the position and shape of the portions 120, this direct correspondence is for purposes of explanation and it should be understood that removal of PTA material may cause the pores 220 to vary in position and shape from the initial position of the portion 120. Furthermore, it should be understood that the depictions in FIG. 1 and FIG. 2 are schematic. As such, the shapes and relative sizes and amounts of the respective phases and/or pores depicted in these figures is not intended to necessarily reflect actual shapes, sizes, and amounts of the phases and/or pores but have been selected to provide clarity in the explanation of certain aspects of the present disclosure.

Alternatively, in some embodiments, the portion 210 used can be a resin material other than PHT. For instance, thermosetting resins based on a trifunctional ethynyl monomer ("tris-E") that can be thermally cured in a temperature range from 200° C. to 350° C. might be used for resin 210. Mixtures of tris-E and PTA can be dissolved in a solvent such as NMP and can be processed at temperatures around 145° C. for 2-3 hours to increase the molecular weight of the tris-E resin component (approximately 27-32% conversion of monomer into higher molecular weight material after 3 hours at 145° C. in NMP) to provide sufficient viscosity for the solution (of tris-E and PTA) to be processed by conventional means for forming coatings, layers, or components. The material can then be cured at around 225° C., or above, to increase the crosslinking density of the tris-E material and also degrade the PTA material so as to yield a porous tris-E material. When the molar mass of the tris-E material increases, the physical blend of PTA and tris-E resin can phase separate. The phase separation depends on the particular affinity between the PTA and tris-E components. For example, different thiol groups used to synthesize the PTA material may change the affinity of the PTA components towards the tris-E components. The curing reaction (10) depicts the formation of a crosslinked tris-E resin from of a trifunctional ethynyl monomer (e.g., 1,3,5 tris-(4-ethynyl phenyl)benzene) as follows:

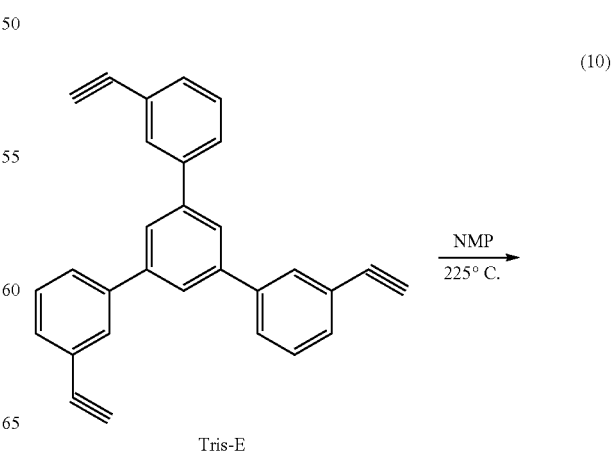

(10)

-continued

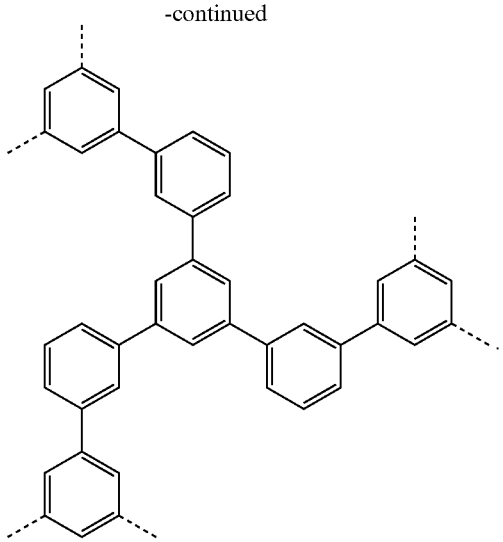

The dashed lines depict connections to other monomer group components, for example.

The process of making a porous tris-E resin material by incorporation of a PTA component is depicted below in scheme (11):

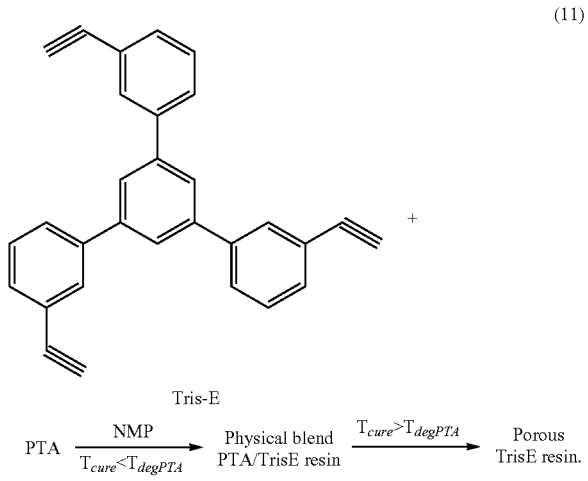

As depicted here, the tris-E monomer and the PTA component are mixed, then heated while in solvent (e.g., NMP) to a first temperature below the degradation temperature of the PTA component, but sufficient to promote reactions of the ethynyl moieties of the tris-E monomer to provide a tris-E resin ("TrisE resin"). For example, the tris-E monomer and the PTA component can be heated to about 145° C. while in NMP to generate the tris-E resin. The mixture is now a physical blend of the tris-E resin and the PTA component. This blend corresponds to resin 100 in FIG. 1. The physical blend may be, for example, molded, applied to a structural or other end-use component, mixed with a filler material, or otherwise processed for forming a structural or other end use component. During or after the processing of the blend, the temperature is increased to a second temperature (around 225° C.) at which the tris-E resin will further cure (crosslink) and the PTA component will degrade or decompose. The porous tris-E resin formed by heating to the second temperature corresponds to porous resin 210 in FIG. 2.

In general, the pore shapes and sizes are a function of the relative ratios of PHT (or tris-E resin) and PTA components incorporated in the resin and the processing conditions used in formation of the resin. For example, an increase in amount of PTA relative to the diamine monomer in the reaction mixture would be expected to result in larger pore sizes, all other things being equal. An increase in curing time would also be expected to result in larger pore sizes as more time would allow more complete phase segregation. Changes in molecular weight and/or degree of polymerization of the PTA could also change resultant pores sizes.

Larger pore sizes are not necessarily preferable, but there is no particular upper limit on the size of the pores formed in the matrix resin beyond the practical limitations associated with structural integrity of the resultant porous resin in its intended end use. FIG. 2 depicts the pores 220 as substantially random voids and does not depict specific connections between adjacent pores 220. While not required, adjacent pores 220 may be connected to each other in certain instances. In many applications it will be preferable for each pore 220 to be on the molecular scale ($\sim 10^{-10}$ m to $10^{-6}$ m), and more preferably on the nanoscale ($\sim 10^{-9}$ m). The size of the pores can be similar to the size of the molecular fragments removed during pore formation. In most cases, the pores are 10 nm to 100 nm in dimension.

The porosity of the resulting material (e.g., porous resin material 200) is dependent on the size of the porogen portions (e.g., portions 120) and on the proportion of porogen portions in the material before pore formation (e.g., resin material 100). The ultimate porosity may be practically limited by the strength requirements of the material in its intended end use. That is, if porosity is too high, strength of the material may be reduced. For most applications, porosity will be less than 60%, for example, 20% to 40% or less. "Porosity," in this context, means the volume of void space in a material divided by the total bulk volume of the material. The resulting porous material may have a bulk density less than 1.5 g/cm³, such as between 1.0 and 1.5 g/cm³, for example about 1.36 g/cm³

Figure 3:
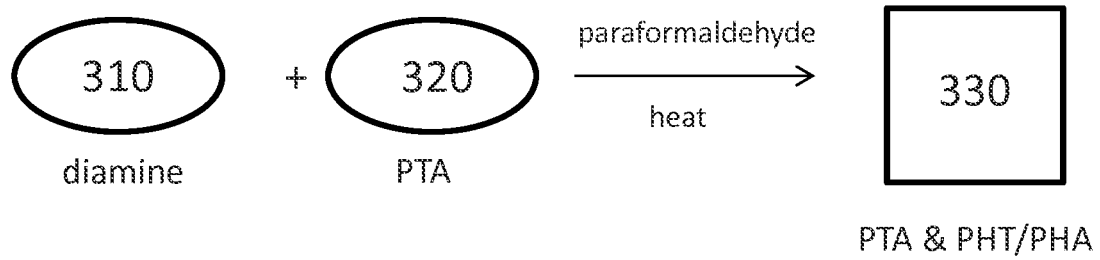
FIG. 3 depicts a scheme for preparing a material having a polyhexahydrotriazine rich phase and a polythioaminal rich phase.

FIG. 3 depicts a scheme for preparing a phase segregated resin, such as the resin 100. A diamine monomer 310 is mixed with a polythioaminal 320. The diamine monomer 310 has the general structure (12):

$$H_2N-R^3-NH_2 \qquad (12)$$

wherein R³ is an aliphatic species or an aromatic species. In a particular embodiment, R³ has the following structure (13):

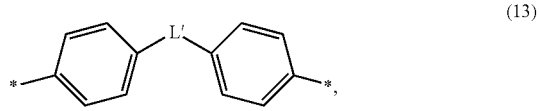

wherein L' is a divalent linking group selected from the group consisting of *—O—*, *—S—*, *—N(R')—*, *—N(H)—*, *—R"—*, and combinations thereof, wherein R' comprises at least 1 carbon and R" comprises at least one carbon. Each starred bond of a structure (13) in this instance covalently bonded to one of the primary amine groups in structure (12). The polythioaminal 320 has a general structure corresponding to structure (3) described above.

The diamine monomer 310 and the polythioaminal 320 are mixed in the presence of paraformaldehyde to form a resin 330 comprising polyhexahydrotriazine and polythioaminal components. In general, resin 330 will comprise a copolymer of polyhexahydrotriazine and polythioaminal, but, depending on the relative feed ratio, it is possible that resin 330 will also include single component polymers in addition to the copolymer. Heating of resin 330 promotes phase segregation such that a PHT rich phase and PTA rich phase will form. At this point, resin 330 corresponds to the depicted structure of resin 100 in FIG. 1 with a PHT rich phase 110 and PTA rich phase 120.

As is known, formation of polyhexahydrotriazine can proceed via formation of a polyhemiaminal (PHA) intermediate (glass transition temperature ($T_g$) ~130° C.). It is possible therefore in this context to form an intermediate resin comprising a polyhemiaminal portion and polythioaminal portion before ultimately curing the resin material to a crosslinked polyhexahydrotriazine material. The intermediate resin may be more easily manipulated for purposes of molding, casting, or otherwise forming parts, devices, films, or structures.

In particular applications where nanoporous end material is desirable, the covalent linkage of the PTA component with the PHT/PHA components would be expected to mitigate phase separation and thus result in localized and relatively small (e.g., nanoscale) PTA rich portions 120. The chemical incorporation of the PTA component within the PHT/PHA portion thus serves ultimately to nanostructure the end product PHT vitrificate (e.g., resin 330) during curing. In other words, by chemically incorporating the PTA component within resin 330 rather than using a simple, physical mixture of different polymers, ultimate pore size in the final porous material (e.g., resin 200) can be controlled to nanoscale dimensions, if desired.

Figure 4:
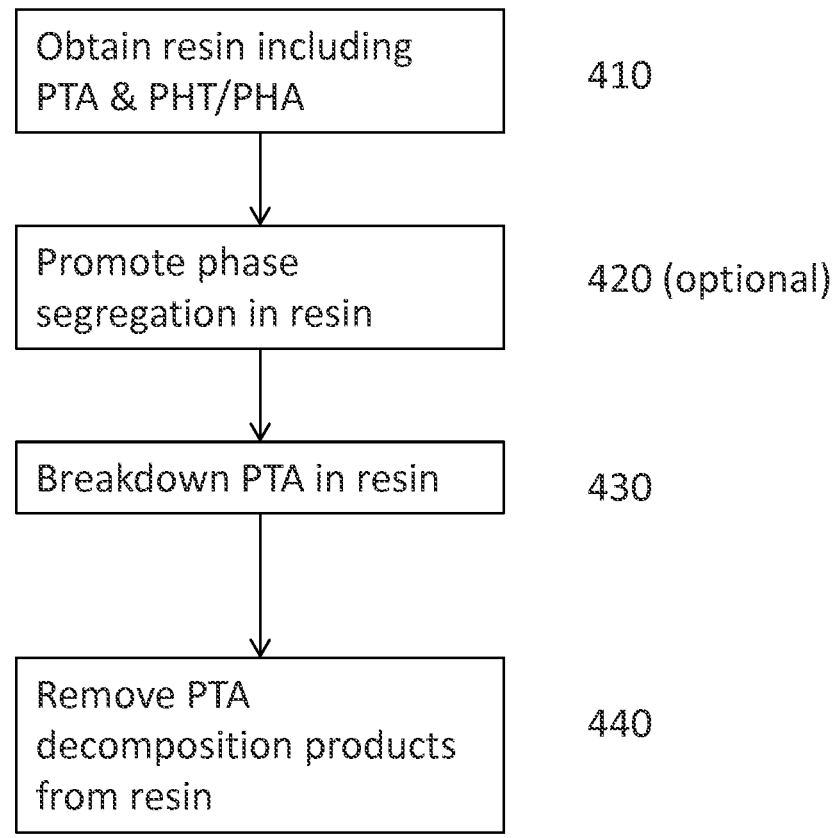
FIG. 4 depicts a process for preparing a porous material.

Regarding FIG. 4, a process 400 for forming a porous material is depicted. At element 410, resin such as resin 100 or resin 330 is obtained, for example, by the process depicted in FIG. 3. The resin includes a PTA portion and PHT portion, for example. The resin can be already phase segregated into a PTA rich phase and PHT rich phase or the resin may be optionally processed (element 420) to promote phase segregation by, for example, heating. For element 430, the resin is, for example, heated to a temperature above the decomposition temperature of the PTA portion. Alternatively, or in addition to heating, element 430 may comprise exposing the phase segregated resin to water and/or an acid, such as a weak acid, such as acetic acid. Element 420 and 430 may be conducted in a combined process, such that, for example, the ramp to the temperature at which PTA decomposes can be controlled or otherwise designed to provide time for phase segregation to occur in the resin before the decomposition temperature is achieved.

Depending on the particulars of internal structure, polythioaminal materials can have a decomposition temperature of 200° C. or less, as measured by thermogravimeteric analysis. Generally, lower molecular weight $R^1$ and $R^2$ groups will provide polymers with lower thermal decomposition temperatures, such as 110° C.-150° C. When used as porogen, lower thermal decomposition temperatures, such as approximately 120° C., may be preferable for the PTA portion as this temperature will generally be below the glass transition temperature of the PHT portion (and the PHA portion, if not yet cured to PHT). When heated above the decomposition temperature, polythioaminal components in resin (e.g., resin 100) can decompose quantitatively into low molar mass products that can easily diffuse through the remaining portion(s) of resin. Furthermore, the heating to decompose the PTA portion can be conducted under low pressure conditions (e.g., sub-atmospheric pressure) such as under vacuum to promote removal of the decomposition products. That is, removal of PTA decomposition products (element 440) can occur during element 430. Alternatively, element 430 (e.g., heating, exposure to water, exposure to acid) and element (440) removal of decomposition products can be conducted in series such that, for example, processing (e.g., heating, exposure to water, exposure to acid) to promote decomposition occurs first, and then vacuum is subsequently applied to promote removal of decomposition products.

Figure 5:
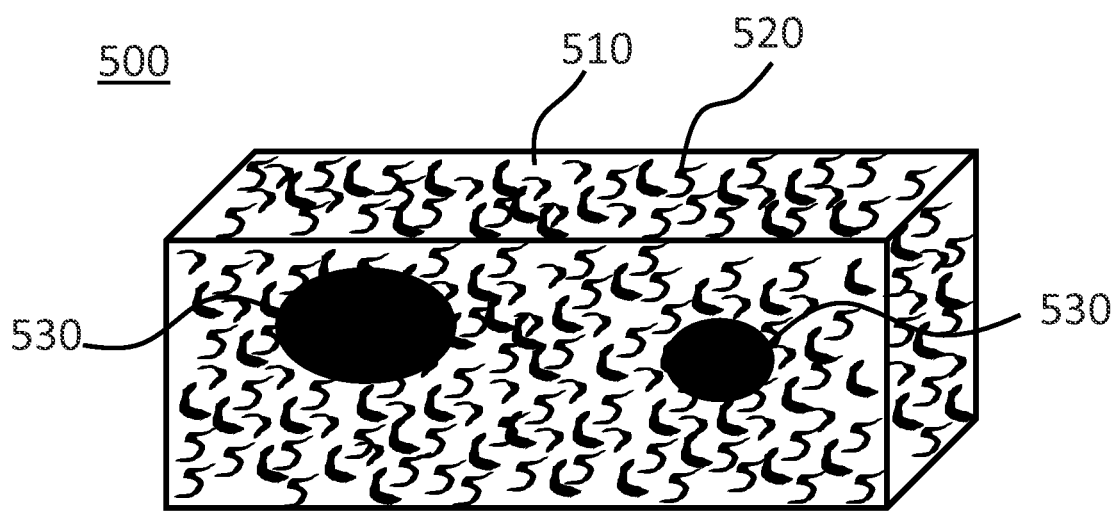
FIG. 5 depicts a composite component including a polyhexahydrotriazine rich phase and a polythioaminal rich phase.

Regarding FIG. 5, a composite component 500 is depicted. Composite component 500 includes resin phase 510, resin phase 520, and filler 530. Composite component 500 can be, for example, a structural component, or a precursor to such, to be used in an automobile, a watercraft, an aircraft, or other vehicle. Resin phase 510 is, for example, a PHT rich phase adjacent to filler 530. Resin phase 510 is similar in most respects to PHT rich phase 110 other than in its adjacency to filler 530. Resin phase 520 is, for example, a PTA rich phase adjacent to filler 530. Resin phase 520 is similar in most respects to PTA rich phase 120 other than in its adjacency to filler 530. Filler 530 is any one or more of a particle, a fiber, a fabric, a nanoparticle, a nanofiber, or a nanotube. In some examples, filler 530 can be carbon fiber or a carbon nanotube.

Figure 6:
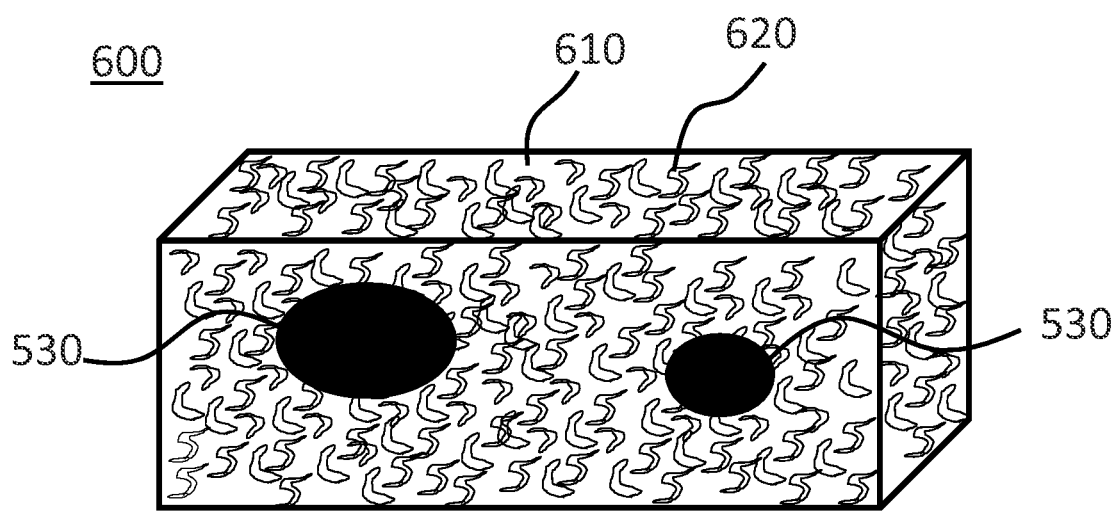
FIG. 6 depicts a composite component comprising a porous material including polyhexahydrotriazine.

Composite component 500 can be processed into composite component 600, depicted in FIG. 6. Composite component 600 includes resin phase 610, pores 620, and filler 530. Composite component 600 can be, for example, a structural component to be used in an automobile, a watercraft, an aircraft, or other vehicle. Resin phase 610 corresponds to resin phase 510 in most respects, but may be cured/crosslinked to a greater extent than resin phase 510 after the processing to remove resin phase 520 and generate pores 620 has been performed. In some embodiments, resin phase 510 may initially be a PHA rich phase and resin phase 610 may be a PHT rich phase formed after the initially formed PHA material is cured to PHT material. Pores 620 are similar in most respects to pores 220 other than with respect to an adjacency to filler 530. In some embodiments, pores 620 are preferably significantly smaller than the filler 530 such that individual pores will not serve as a defect or stress concentrator in the component 600. For example, if filler 530 is a carbon fiber having a diameter in a range of 5 to 10 micrometers (µm), pores 620 can be nanoscale.

Furthermore, it should be noted the depictions in FIG. 5 and FIG. 6 are schematic. As such, the shapes and relative sizes and amounts of the respective phases, pores and/or fillers depicted in these figures is not intended to necessarily reflect actual shapes, sizes, and amounts of the phases, pores, and/or fillers.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing is directed to embodiments of the present invention, other and further embodiments of the invention may be devised without departing from the basic scope thereof, and the scope thereof is determined by the claims that follow.

What is claimed is:

1. A method, comprising:
   forming a reaction mixture comprising: i) paraformaldehyde, ii) a monomer including at least two primary aromatic amine groups, and iii) a polythioaminal including at least two primary aromatic amine groups; and
   heating the reaction mixture to form a resin including a polyhexahydrotriazine component and a polythioaminal component.

2. The method of claim 1, further comprising heating the resin to form a phase segregated resin including a first portion in which the polyhexahydrotriazine component is predominant and a second portion in which the polythioaminal component is predominant.

3. The method of claim 2, further comprising heating the phase segregated resin to a temperature at which the polythioaminal component decomposes and at which the polyhexahydrotriazine component is substantially stable.

4. The method of claim 3, wherein the heating of the phase segregated resin is performed at a pressure below 1 atm.

5. The method of claim 3, wherein the reaction mixture further comprises a filler material.

6. The method of claim 5, wherein the filler is at least one of a carbon fiber and a carbon nanotube.

7. The method of claim 2, further comprising exposing the phase segregated resin to at least one of water and a weak acid to decompose the polythioaminal component.

8. The method of claim 1, wherein the reaction mixture further comprises a filler material.

9. The method of claim 8, wherein the filler comprises at least one of a carbon fiber and carbon nanotube.

10. The method of claim 1, further comprising:
    obtaining the polythioaminal including two primary aromatic amine groups by mixing an N-substituted hexahydrotriazine with a dithiol to form a first polythioaminal polymer, then mixing a thiol-reactive material with the first polythioaminal polymer to form a second polythioaminal polymer incorporating the thiol-reactive material.

11. The method of claim 2, further comprising:
    molding the resin before forming the phase segregated resin.

12. The method of claim 2, further comprising:
    forming a cured resin material including pores therein by heating the phase segregated resin to a temperature at which the polythioaminal component decomposes and at which the polyhexahydrotriazine component is substantially stable.

13. A method, comprising:
    preparing a reaction mixture including: i) a polythioaminal having 4-aminophenyl end groups, ii) a diamine monomer having two 4-aminophenyl groups, and iii) paraformaldehyde; and
    heating the reaction mixture to form a resin including a polythioaminal portion and a polyhexahydrotriazine portion.

14. The method of claim 13, wherein a filler material is included in the resin.

15. The method of claim 13, wherein the polythioaminal has the following structure:

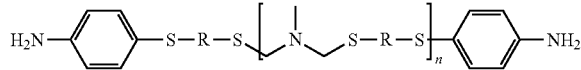

wherein R is an alkly group and n is an integer greater than 1.

16. The method of claim 13, further comprising:
    heating the resin to a temperature at or above a temperature at which the polythioaminal component decomposes.

* * * * *